UNITED STATES PATENT OFFICE.

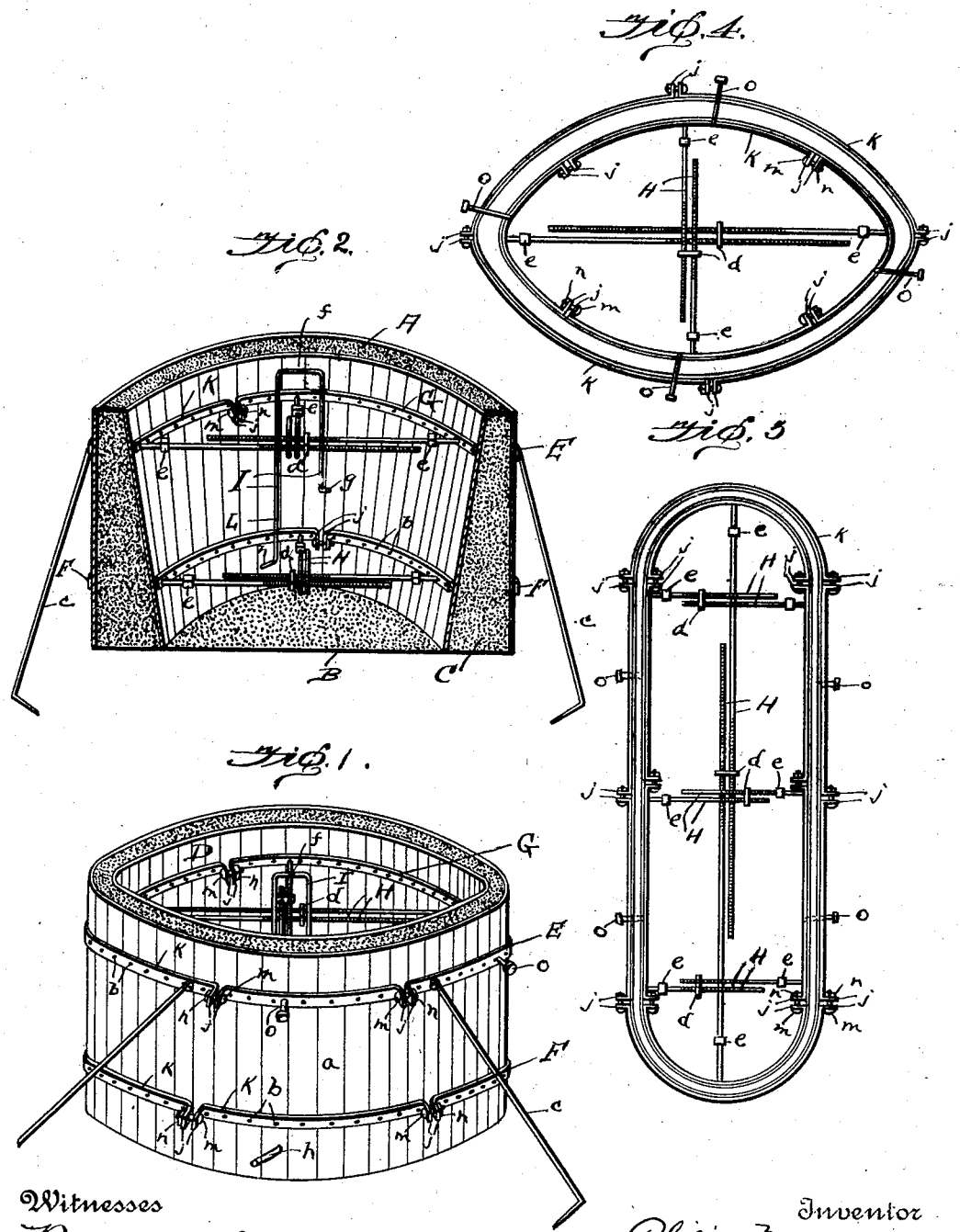

PHILIP MANSAN, OF AMANDA, OHIO.

WATER-TANK MOLD FOR MAKING WATER-TANKS.

SPECIFICATION forming part of Letters Patent No. 720,371, dated February 10, 1903.

Application filed May 14, 1902. Serial No. 107,375. (No model.)

*To all whom it may concern:*

Be it known that I, PHILIP MANSAN, a citizen of the United States, residing at Amanda, in the county of Fairfield and State of Ohio, have invented a new and useful Water-Tank Mold for Making Water-Tanks, of which the following is a specification.

My invention relates to improvements in water-tanks and water-tank molds.

The object of my invention is to improve the form and construction of water-tanks and to provide a simple and cheap mold by which a water-tank of artificial stone may be readily made. I attain these objects by the use of a mold consisting in the construction and novel combination and arrangement of parts hereinafter fully described, illustrated in the accompanying drawings, and pointed out in the claims appended hereto.

In the accompanying drawings, Figure 1 represents a circular water-tank and mold constructed according to my invention. Fig. 2 represents a transverse section of a circular tank and mold cut vertically through the middle. Fig. 3 represents a top view of the inner and outer bands to which the staves are detachably secured throughout their entire circuit and which shows the shape in which they are placed to shape the frame of the mold for the elongated form of the tank with round ends. Fig. 4 represents a top view of the inner and outer bands to which the staves are attached throughout their entire circuit and shows the shape in which they are placed to shape the frames of the mold for the oval or elliptical form of the tank.

Like letters of reference indicate like or corresponding parts throughout the drawings.

Fig. 1 represents a water-tank and the mold constructed of artificial stone composed of cement, crushed stone, gravel and sand, or like material. The tank A is stationary, and its bottom B (shown in Fig. 2) and sides C (shown in Fig. 2) are formed by the use of a removable sectional mold composed of inner and outer frames D and E. The outer frame is composed of two bands F F, to which are attached on their inner sides, by means of screws or bolts and nuts $b\ b$, &c., adjoining staves $a\ a$, &c., throughout their entire circuit. The outer frame is held in place by means of a sufficient number of stay-rods $c\ c$, detachably secured to the upper part of the outer frame. $o\ o$ represent set-screws passing through threaded apertures in the upper outer band and frame, the inner ends of which pass on over the top of the tank and engage the inner frame. A sufficient number of these set-screws is thus used to so adjust the inner and outer frames that the space between them is always the same throughout the circuit taken between them at any given height.

Fig. 2 represents a transverse view of a circular tank and mold cut vertically through the middle. B represents the bottom of the stone tank and C the walls or sides. G represents the bands of the inner frame, to which are detachably secured on their outer side at $b\ b$, &c., adjoining staves $a\ a$, &c., continuously throughout the entire circuit of said bands. H H are the adjusting brace-rods of said inner bands. I represents the overflow-pipe, which has a larger aperture and will carry more water than the inflow-pipe. It is located on the inside of the inner frame of the mold and tank and close to it and remains in the tank after the molds have been removed. The surplus water is led from the inlet $g$ of said pipe, which is near the center of the depth of the tank, upward to within about an inch of the top of the tank, where it leads it horizontally toward the wall of the tank for a short distance to the descending side $h$ of said pipe, which leads it to near the bottom of the inner side of the tank, where it is then conveyed by said pipe horizontally through the wall of the tank to the outside and is discharged. Said overflow-pipe is provided with an air-opening $f$ in its horizontal section, which may be left open in non-freezing weather, thus preventing the overflow-pipe from acting as a siphon, which will leave the tank nearly full of water, and said opening may be closed in freezing weather, thus causing said overflow-pipe to act as a siphon, which will keep the water lower in the tank, and thus lessen the chances of freezing and bursting the tank. By having said overflow-pipe begin or receive the water near the middle of the depth of the tank the clogging of the pipe from the drift on the surface water of the tank is avoided. The top of said inner frame when in use is extended above the top of the outer frame to facilitate the placing of the plastic material and prevent its falling on the inside of said inner frame. The inner frame is smaller at its bottom than at its top, while the outer frame is not, which makes the sides or walls C of the tank thicker and stronger at the bottom, somewhat kettle-shaped inside where the pressure is greatest, which has a strong tendency to overcome and prevent the effects of freezing on the tank.

Figs. 3 and 4 represent some of the different forms of the inner frame into which the frames and tank may be shaped, giving it round ends, thus dispensing with the square corners on the tank which are so much in the way and so likely to be broken by external forces. H H represent adjustable brace-rods which pass through the encircled space from one side to the opposite side and engage with one opposite end of each parallel pair the bands of the inner frame G G. Each parallel pair of said brace-rods is provided with a double nut $d\ d$. Each of said brace-rods is also provided with threads beginning on its free end and extending toward the engaged end to a squared or blocked portion of said brace-rod $e\ e$. The threaded end of each brace-rod H passes through one of the threaded apertures of its double nut $d$, and the free parallel brace-rod passes through the outer threaded aperture of their double nut $d$. The blocked portion $e$ of each brace-rod H is designed to engage the wrench for adjusting the bands and frames to any desired form. The size and material of said bands are designed to be sufficiently flexible to allow the adjustment of the mold to any required form. The side sections of the bands for the elongated form of the tank, as shown in Fig. 3, may be made straight. Each section of each band is provided with a fang $j$ at each end, which fang turns outward in the sections of the bands for the outer frame and inward in the sections of the bands for the inner frame. Each fang is provided with an aperture which is directly opposite the aperture of the fang which is parallel to it in the adjoining section, each fang of a parallel pair corresponding and belonging to the fang of an adjoining section $k\ k$ of the bands. Each pair of parallel fangs $j$ receives through the apertures of its respective fangs a bolt $m$, secured by a nut $n$, which bolt and nut securely fasten the adjoining sections of the bands.

The tank may be provided with rods crossing the space inclosed by said tank and embedded in the material to increase the strength thereof.

The tank is designed to be provided with a suitable inlet-pipe and may be provided with any other outlet-pipe than the one described.

Changes in the form, proportions, and the minor details of construction may be resorted to without departing from the principle or sacrificing any of the advantages of this invention.

To use the mold, first prepare the ground for the bottom of the tank. Then adjust the mold and make the bottom the desired thickness. Then fill the space between the frames with the plastic material, and when sufficiently dry and hard remove the mold.

Having thus described my invention, what I claim, and desire to secure by Letters Patent, is—

1. In a water-tank mold, the combination with two flexible bands, one near the top and the other near the bottom of a tank-mold, said bands being composed of different sections, each section of which has a fang at each end, which fang turns either inward or outward to meet, or nearly meet, in a parallel direction, its corresponding fang in an adjoining section; each section having a number of holes for detachably securing the staves, and each fang having a hole directly opposite the hole of its parallel fang, and a bolt with nut passing through the opposite holes of each set of parallel fangs and holding the adjoining sections securely together, of upright staves with edges joining, detachably secured to said bands on the inner side of said bands in the outer frame, and on the outer side of said bands in the inner frame, continuously throughout the entire circuit of said bands thus completing the inclosure made by the frames.

2. In a water-tank mold, the combination with two flexible bands, one near the top and the other near the bottom of a tank-mold, said bands being composed of different sections, each section of which has a fang at each end, which fangs turn inward for the inner frame to meet, or nearly meet, in a parallel direction its corresponding fang in an adjoining section; each section having a number of holes for detachably securing the staves and each fang having a hole directly opposite the hole of its parallel fang, and a bolt with nut passing through the opposite holes of the adjoining fangs, and holding the adjoining sections, and staves with edges joining detachably secured to said bands continuously throughout their entire circuit, of adjusting brace-rods passing from one side toward the opposite side, whose opposite ends engage the inner band at opposite points; said adjustable rods having a blocked portion near the engaged end for engaging a wrench; and having their remaining portion from the blocked portion to the free end threaded, said brace-rods being used in pairs parallel to each other and having the threaded end of each pass through its proper threaded aperture in a double nut prepared for each pair of parallel adjusting brace-rods.

3. In a water-tank mold, the combination with the outer frame consisting of two flexible sectional bands, one near the top and the other near the bottom, each section of which has a fang at each end, said sections being securely attached at their fangs, and having upright adjoining staves attached thereto throughout their entire circuit, of a sufficient number of stay-rods detachably secured to the outer frame near its top of proper length to anchor in the ground so as to hold the frame firmly in place.

4. In a water-tank mold, the combination with an outer separable frame, consisting of two sectional flexible bands, one near the top and the other near the bottom, having upright staves detachably secured to them whose edges meet throughout the entire circuit of said bands, and having a sufficient number of stay-rods detachably secured near the top of the tank and transverse adjusting-screws passing through the upper band and staves of the outer frame, and engaging the inner frame; an inner frame having its upper edges above those of the outer frame, consisting of two adjustable, sectional, flexible bands having adjusting brace-rods extending from side to side, one near the inner top and the other, a smaller one, near the inner bottom and having staves detachably secured to them whose edges meet and whose tops lean slightly outward from a perpendicular, of an outflow-pipe beginning inside the inner frame near its walls and about the middle of the depth of the tank, and extending upward to within about an inch of the top of the tank, then running horizontally toward the wall, and having an air-aperture in the top of this section, then passing down near the wall close to the bottom of the tank and there passing out through the wall of the tank.

PHILIP  his  X  MANSAN.
mark

Witnesses:
C. A. LEIST,
FRED R. NICHOLAS.